(12) United States Patent
Lai (10) Patent No.: US 8,460,019 B2
(45) Date of Patent: Jun. 11, 2013

(54) CARD CONNECTOR WITH SEPARABLE CARD TRAY

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 213 days.

(21) Appl. No.: 13/187,756

(22) Filed: Jul. 21, 2011

(65) Prior Publication Data

US 2012/0309213 A1 Dec. 6, 2012

(30) Foreign Application Priority Data

May 31, 2011 (TW) .............................. 100209820 U (51) Int. Cl.
*H01R 13/62* (2006.01)
(52) U.S. Cl.
USPC .......................................... 439/159; 439/630
(58) Field of Classification Search
USPC ................... 439/159, 630, 607.31, 607.32
See application file for complete search history.

(56) References Cited

U.S. PATENT DOCUMENTS

| 7,229,300 | B2 | 6/2007 | Lai et al. | |
|---|---|---|---|---|
| 7,267,565 | B2 | 9/2007 | Hsu et al. | |
| 7,357,674 | B2 * | 4/2008 | Anzai et al. | 439/607.22 |
| 7,393,221 | B2 | 7/2008 | Feng et al. | |
| 8,376,764 | B1 * | 2/2013 | Su et al. | 439/157 |
| 8,393,909 | B1 * | 3/2013 | Lai et al. | 439/159 |
| 2007/0049080 | A1 * | 3/2007 | Anzai et al. | 439/159 |
| 2007/0105446 | A1 * | 5/2007 | Lai et al. | 439/630 |
| 2007/0178733 | A1 * | 8/2007 | Sadatoku | 439/159 |
| 2010/0130040 | A1 * | 5/2010 | Matsunaga | 439/159 |

* cited by examiner

*Primary Examiner* — Hae Moon Hyeon (74) *Attorney, Agent, or Firm* — Muncy, Geissler, Olds & Lowe, PLLC (57) ABSTRACT

A card connector includes a shell having an entrance formed at a front end thereof, at least one terminal set, a card tray having a lateral portion, an ejecting assembly composed of a heart-shaped guide groove formed at the lateral portion, a guide member having two ends, one of which is pivoted to the shell and the other has an interference portion for interference with the guide groove, and a springy member mounted inside the shell and working on the card tray; and a springy biasing member mounted to shell and applying the resilience to the guide groove. The lateral portion includes an extension groove having two ends, one of which communicates with the guide groove and the other extends rearward to be an open end. When the card tray is inserted into the shell through the entrance, the open end allows the interference portion to enter the extension groove.

10 Claims, 14 Drawing Sheets

CARD CONNECTOR WITH SEPARABLE CARD TRAY

BACKGROUND OF THE INVENTION

1. Field of the Invention

The present invention relates generally to a memory card connector, and more particularly, to a card connector with a separable card tray.

2. Description of the Related Art

U.S. Pat. No. 7,267,565 disclosed a card connector having an ejector, which can eject a memory card, and a heart-shaped slot, which can allow a pin member to function therein as holding the memory card while the card is inserted or ejected in such a way that a user can push the card again to eject the card after the card is inserted for the purpose of convenient operation.

U.S. Pat. Nos. 7,229,300 and 7,393,221 each disclosed a drawer-type all-in-one card connector, of which a sliding box can carry a memory card and then be inserted into the car connector. The sliding box has a heart-shaped groove formed at one side thereof and working with a limiter for insertion and ejection of the card.

However, in the aforesaid drawer-type all-in-one card connectors, the sliding box can only be pulled outward to a predetermined position but fails to be separated from the card connector owing to the locating rod and the locating groove. When the user intends to insert a memory card into the card connector, it is necessary to pull the sliding box outward to an outmost position in such a way that the card can be put in the sliding box and then both can be pushed into the card connector. If the sliding box is not pulled outward to the outmost position, it will be difficult for the user to put the card into the sliding box. If the user carelessly pulls the sliding box outward with too much strength, the locating rod and groove may be damaged to disable the normal functions of insertion and ejection of the card.

SUMMARY OF THE INVENTION

The primary objective of the present invention is to provide a card connector, which allows insertion and ejection of a memory card.

The secondary objective of the present invention is to provide a card connector, of which a card tray is though separable therefrom but the card tray can still function normally while it is put back into the card connector, thus being convenient in operation.

The foregoing objectives of the present invention are attained by the card connector composed of a shell, at least one terminal set, a card tray, an ejecting assembly, and a springy biasing member. The shell includes an insertion chamber formed therein and an entrance formed at a front end thereof for communication with the insertion chamber. The at least one terminal set is formed of a plurality of terminals and mounted to the shell, extending into the insertion chamber. The card tray is inserted into the shell through the entrance and includes at least one card supporting portion and a lateral portion. The at least one card supporting portion can carry at least one memory card. When the card tray is inserted into the shell, the at least one card supporting portion is located at the insertion chamber and allows the at least one memory card for contact with the at least one terminal set. The ejecting assembly is formed of a heart-shaped guide groove, a guide member, and a springy member. The heart-shaped guide groove is formed at one lateral side of the card tray. The guide member has a pivot portion formed at one end thereof and pivotally mounted to the shell, and an interference portion formed at the other end thereof for interference with the heart-shaped guide groove. The guide member is suppressed by the shell to be limited to a predetermined height. The springy member is mounted inside the shell and works on the guide member for resiliently forcing the interference portion toward a predetermined position. The card tray can further has an extension groove formed at the lateral portion of the card tray. The extension groove is provided with two ends, one of which communicates with the heart-shaped guide groove and the other extends rearward to a distal end of the lateral side of the card tray to be an open end. When the card tray is inserted into the shell, the open end of the extension groove corresponds to the predetermined position to allow entry of the interference portion therein. In this way, the card connector can allow separation of the card tray therefrom in addition to the insertion and ejection of the memory card, and the card tray can still function normally while put back into the card connector.

DETAILED DESCRIPTION OF PREFERRED EMBODIMENTS

Referring to FIGS. 1-10, a card connector 10 constructed according to a preferred embodiment of the present invention is composed of a shell 11, two terminal sets 21, a card tray 31, an ejecting assembly 41, and a springy biasing member 51. The detailed descriptions and operations of these elements as well as their interrelations are recited in the respective paragraphs as follows.

The shell 11 is formed of a base frame 12, a cover 16, an insertion chamber 18 formed between the base frame 12 and the cover 16, and an entrance 19 formed at a front side thereof and communicating with the insertion chamber 18. The base frame 12 includes a locating pin 121, a corresponding portion 122, a support piece 123, and a locating wall 124. The cover 16 has a suppressing portion 161 protruding toward the insertion chamber 18 therefrom.

The two terminal sets 21 each are formed of a plurality of terminals and mounted to the shell 11, extending into the insertion chamber 18. In this embodiment, one of the two terminal sets 21 is mounted to the base frame 12 and the other is mounted to cover 16.

The card tray 31 can be inserted through the entrance 19 and includes two card retaining portions 32 and 33 and a lateral portion 34. The card supporting portions 32 and 33 are superimposed on each other for carrying a memory card (not shown). When the tray 31 is inserted into the shell 11, the two card supporting portions 32 and 33 are located inside the insertion chamber 18 for allowing the two memory cards to electrically contact the terminal sets 21.

The ejecting assembly 41 is formed of a heart-shaped guide groove 42, a guide member 44, and a springy member 46. The heart-shaped guide groove 42 is formed at the lateral portion 34 of the card tray 31. The guide member 44 includes a pivot portion 441 formed at one end and an interference portion 442 formed at the other end thereof for interference with the heart-shaped guide groove 42. The interference portion 442 is located in front of the pivot portion 441. The support piece 123 is located between the interference portion 442 and the pivot portion 441 for supporting the guide member 44 up to a predetermined height. The suppressing portion 161 is located above the guide member 44 for suppressing and limiting the guide member 44 to a predetermined height. The springy member 46 is mounted to the base frame 12 and works on the card tray 31 for pushing the card tray 31 outward by resilience generated thereby. In this embodiment, the springy member 46 is a compression spring having a fastening portion 461 formed at one end thereof and fixed to the corresponding portion 122. The aforesaid end of the springy member 46 where the fastening portion 461 is located is sleeved onto the locating pin 121 to be stopped against the base frame 12.

The card tray 31 further includes an extension groove 35 formed at the lateral portion 34. The extension groove 35 is provided with two ends, one of which communicates with the heart-shaped guide groove 42 and the other extends rearward to a distal end of the lateral portion 34 to be an open end 351. In this embodiment, the heart-shaped guide groove 42 and the extension groove 35 are located on a top side of the lateral portion 34. The extension groove 35 is getting lower from front to back. The lowest position of the extension groove 35 is lower than a bottom end of the interference portion 442. When the card tray 31 is inserted into the shell 11, the open end 351 corresponds to the predetermined position to allow the interference portion 442 to enter.

The springy biasing member 51 is mounted to the shell 11 for applying resilience generated thereby to the guide member 44 to push the interference portion 442 to a predetermined position. In this embodiment, the locating wall 124 is located at one side of the insertion chamber 18 and close to and in front of the pivot portion 441. The springy biasing member 51 is a tongue having two ends, one of which is mounted to the cover 16 and the other is stopped against the guide member 44 for pushing and forcing the guide member 44 to contact against the locating wall 124 by the resilience to be positioned. In this way, the interference portion 442 is fixed to the predetermined position.

In this embodiment, the shell 11 is composed of the base frame 12 and the cover 16 as an example, and the aforesaid elements mounted to the base frame 12 or the cover 16 are for illustration only; they can be mounted to the cover 16 or the base frame 12 instead as per requirement of actual production.

Figure 1:
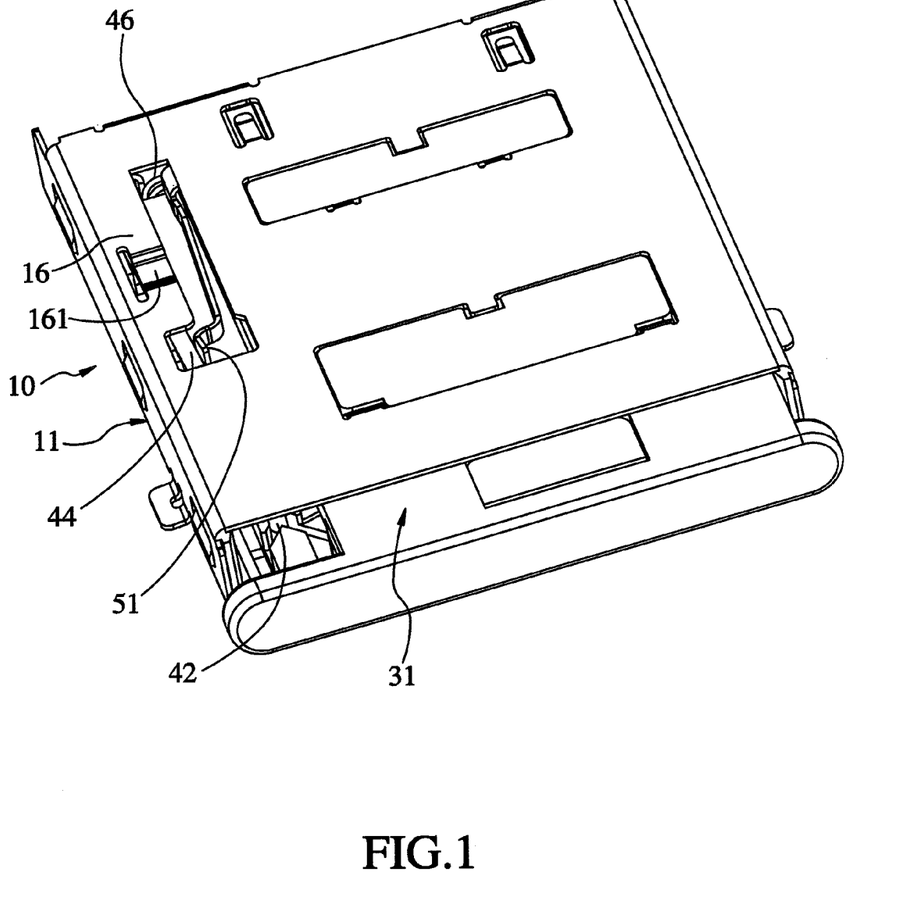
FIG. 1 is a perspective view of a preferred embodiment of the present invention.
Figure 2:
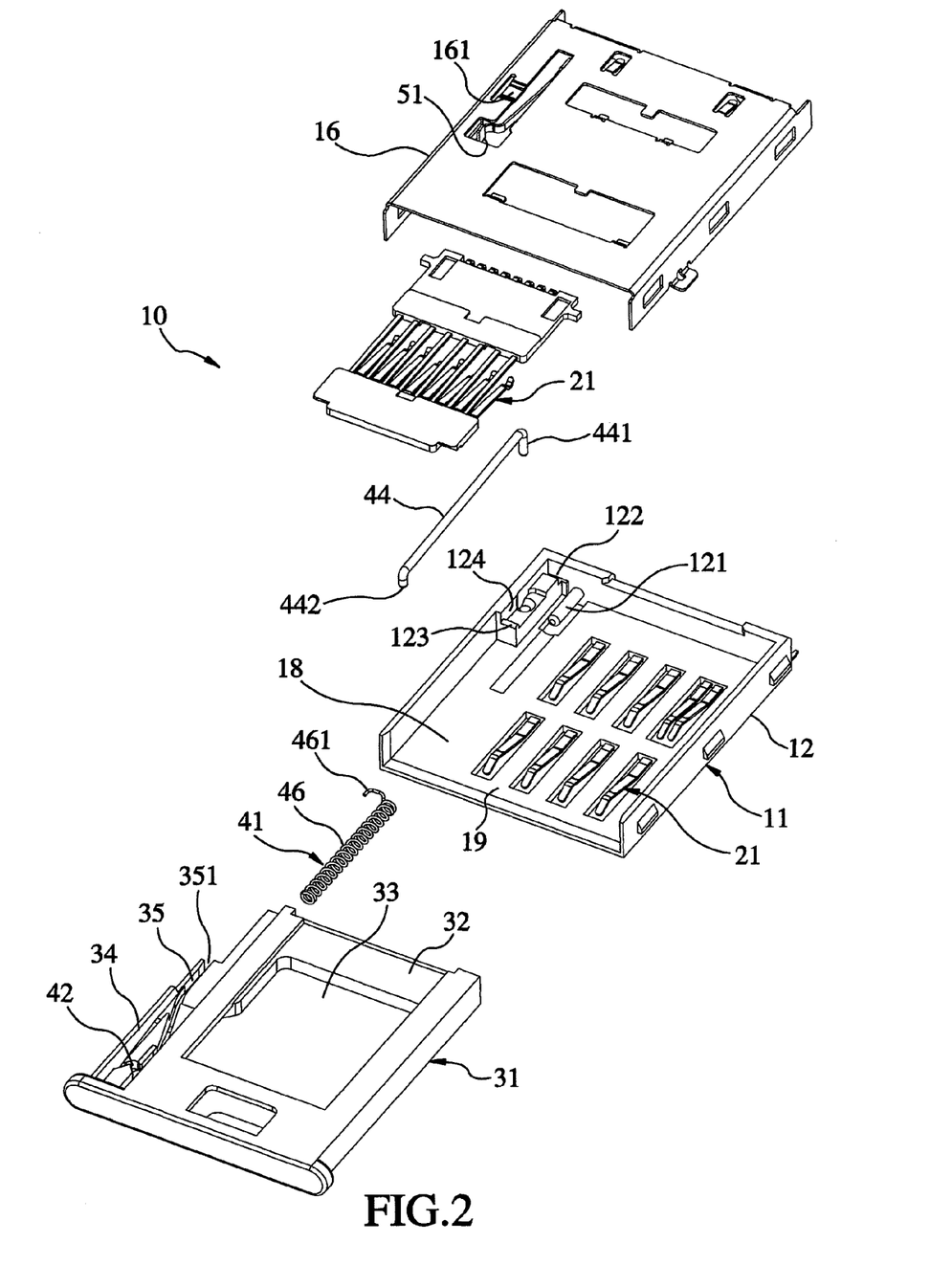
FIG. 2 is an exploded view of the preferred embodiment of the present invention.
Figure 3:
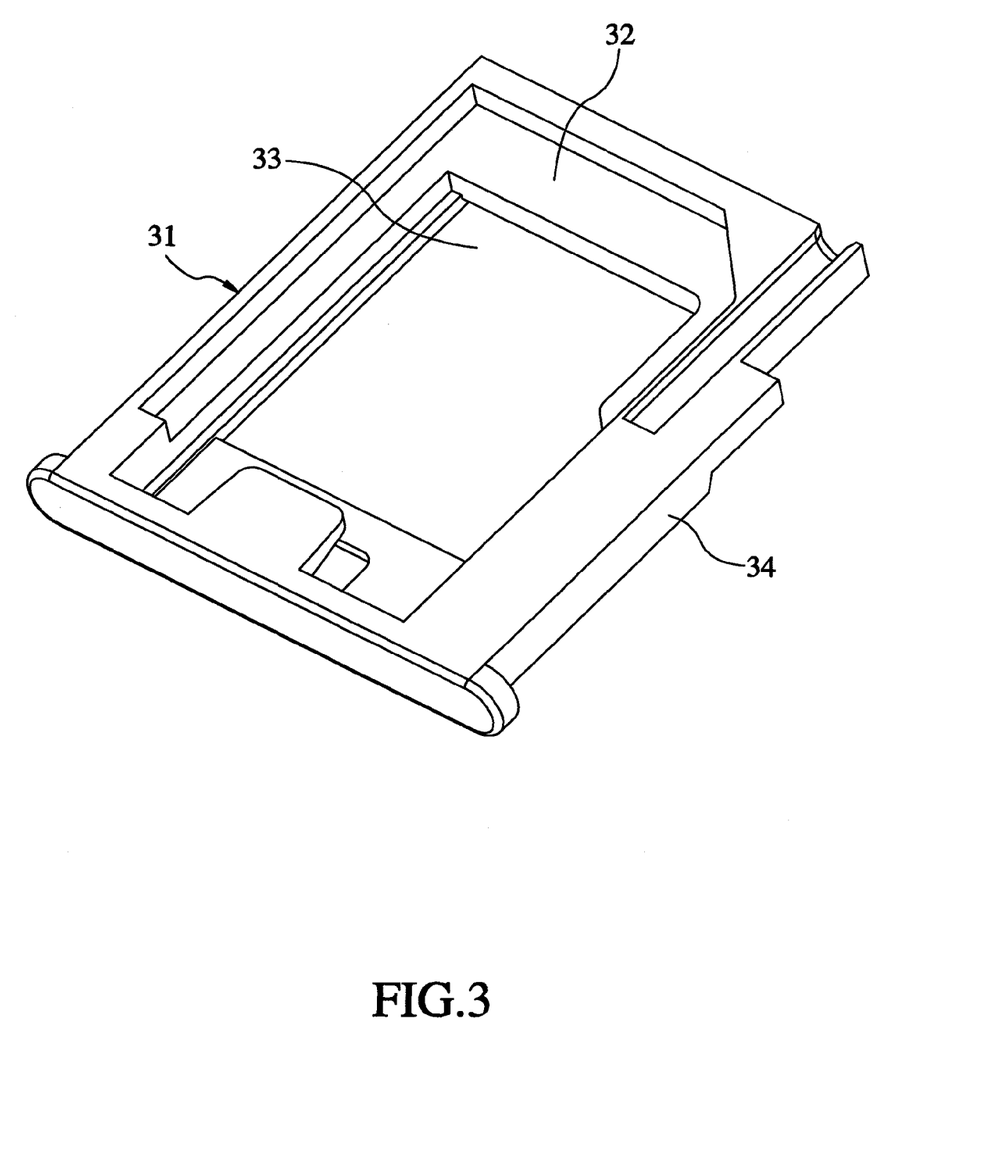
FIG. 3 is a bottom view of a part of the preferred embodiment of the present invention.
Figure 4:
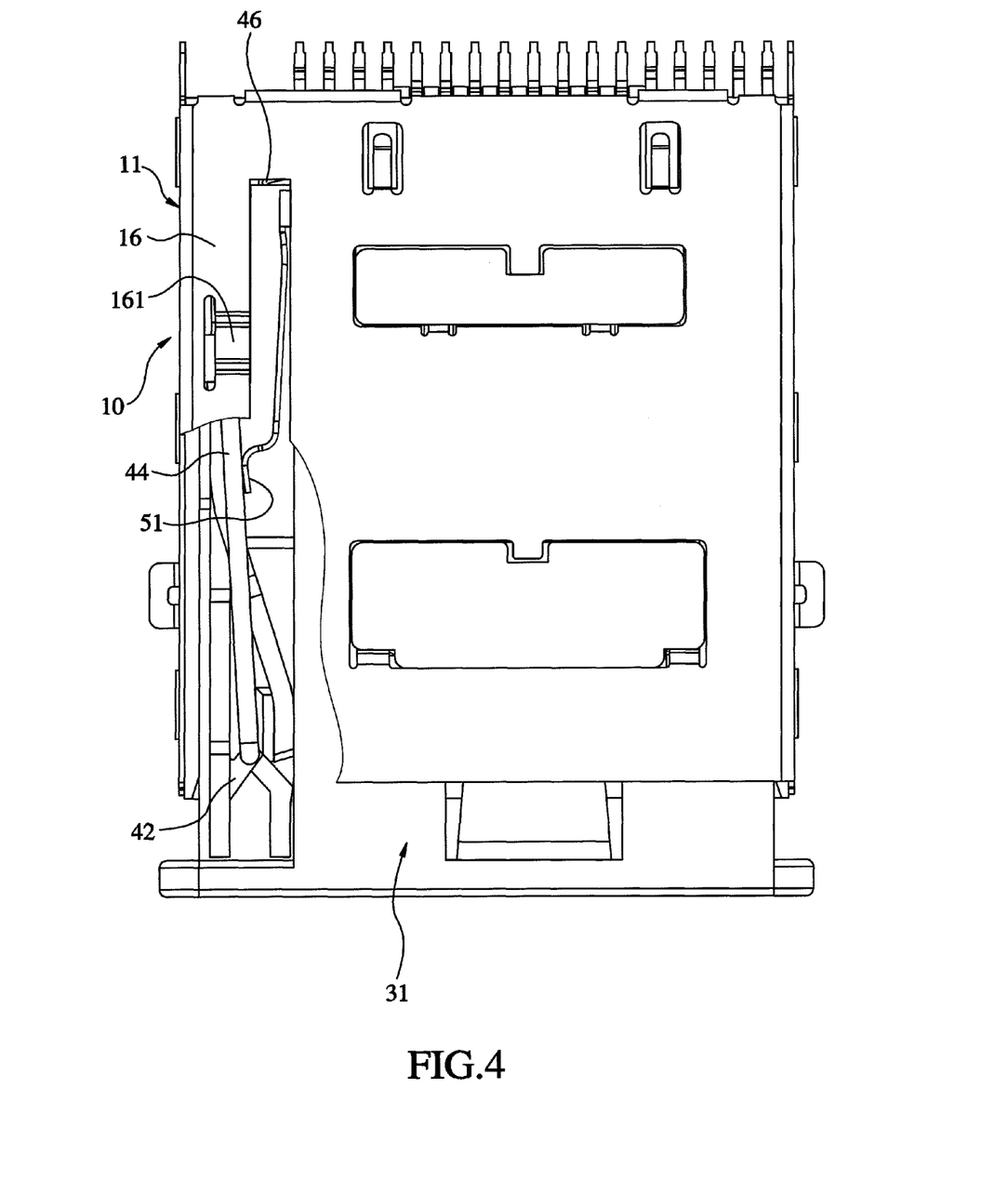
FIG. 4 is a top view of the preferred embodiment of the present invention, illustrating that the cover is partially removed for clear manifestation of internal elements.
Figure 5:
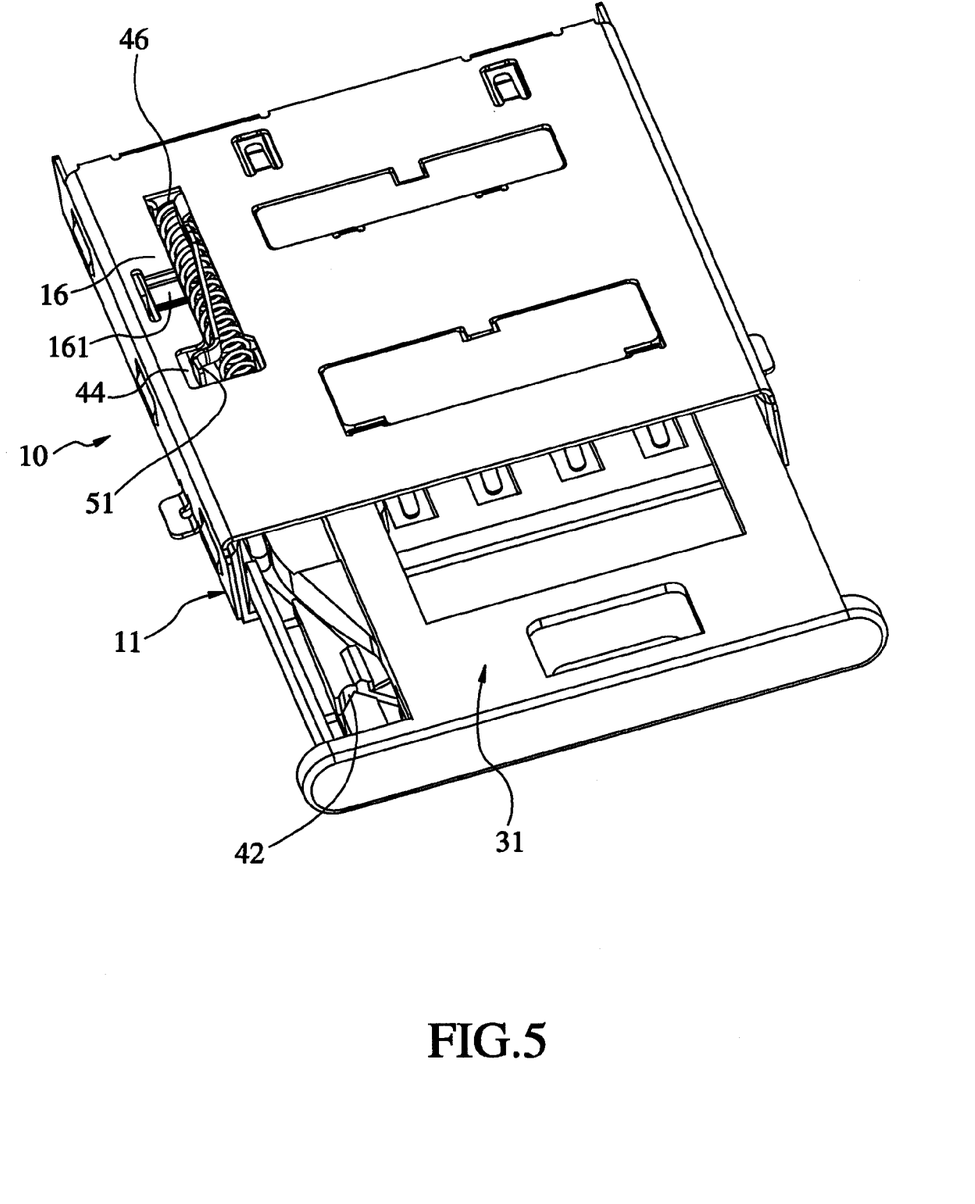
FIG. 5 is similar to FIG. 1, illustrating that the card tray is moved outward for some distance.
Figure 6:
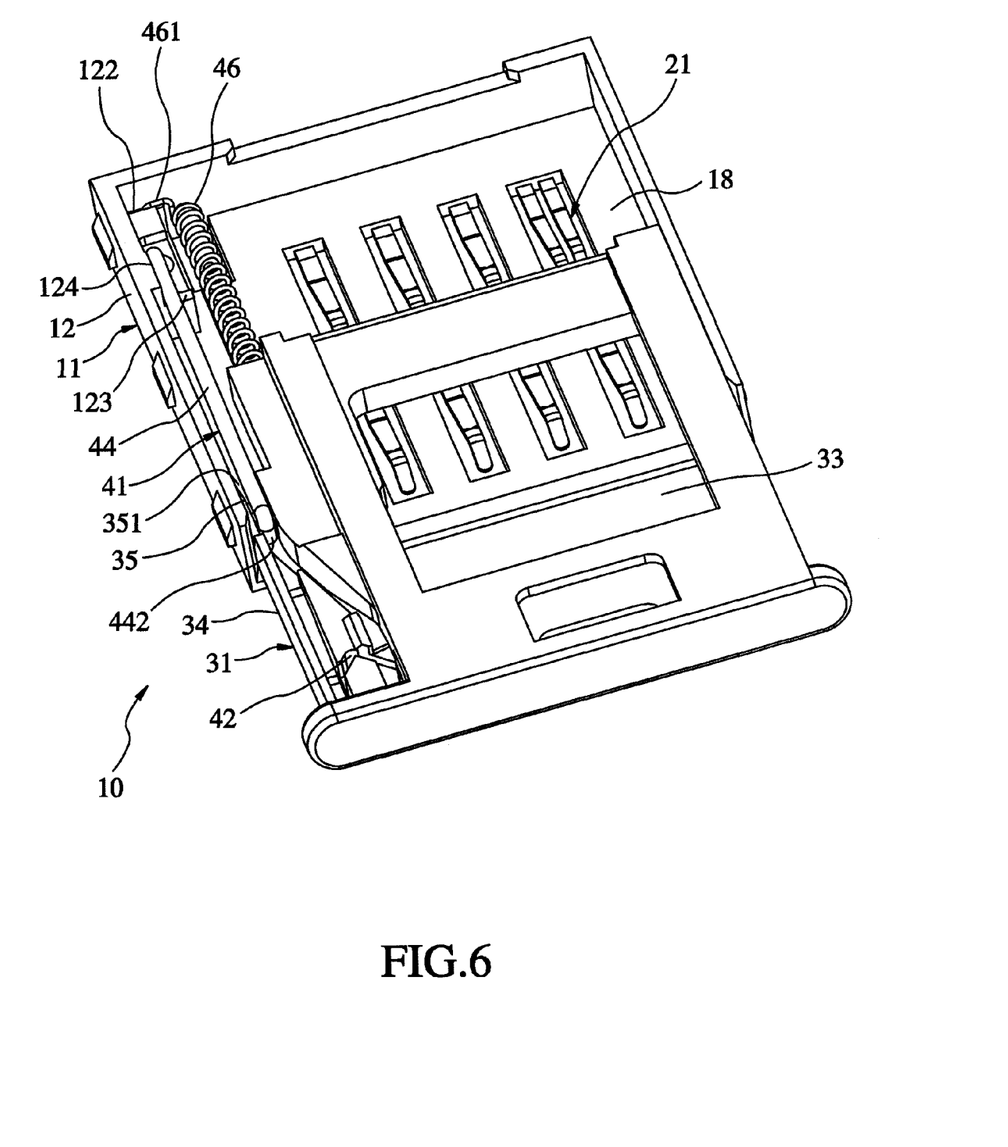
FIG. 6 is a perspective view of a preferred embodiment of the present invention, illustrating that the cover is removed.
Figure 7:
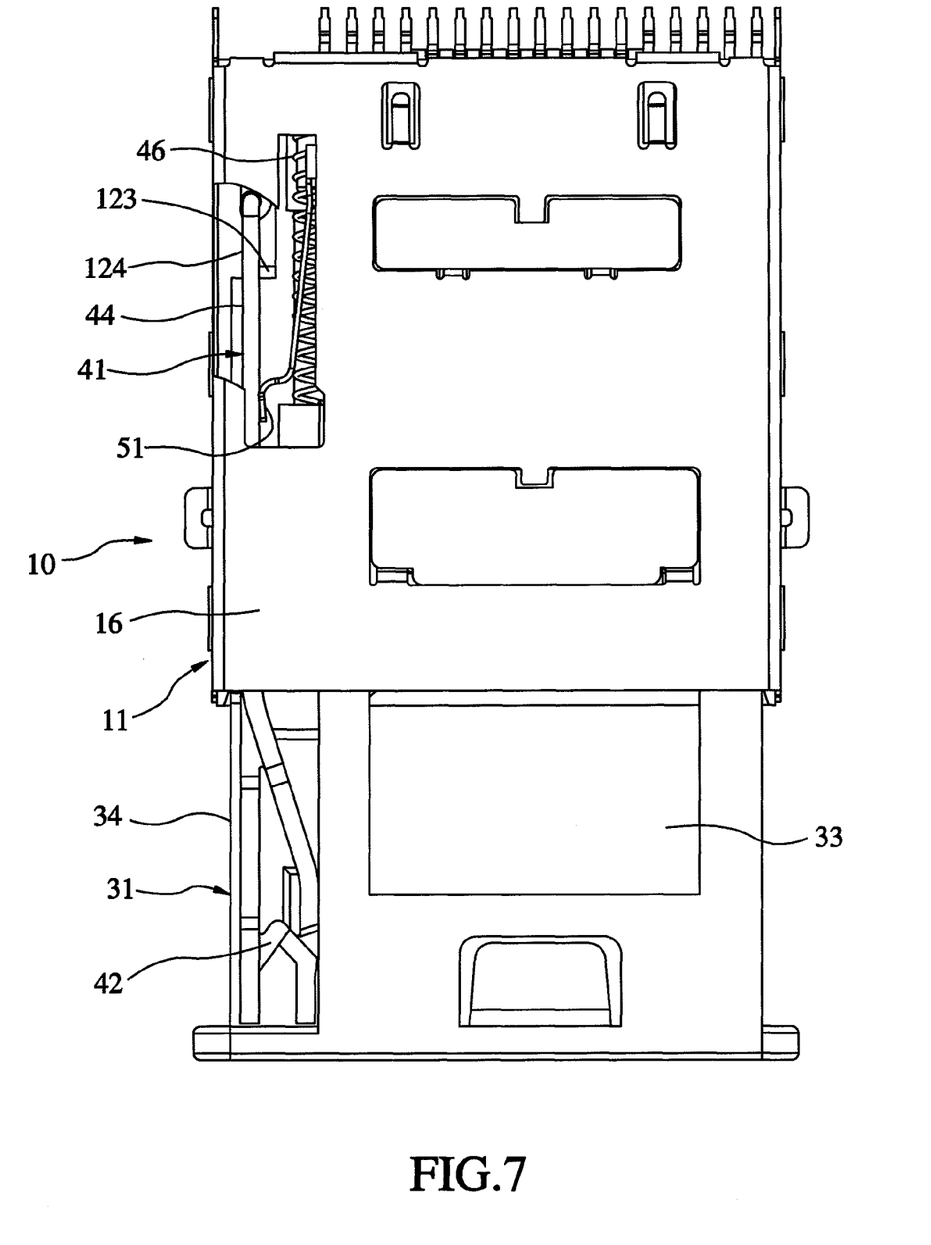
FIG. 7 is a top view of the preferred embodiment of the present invention, illustrating that the cover is partially removed for clear manifestation of internal elements.
Figure 8:
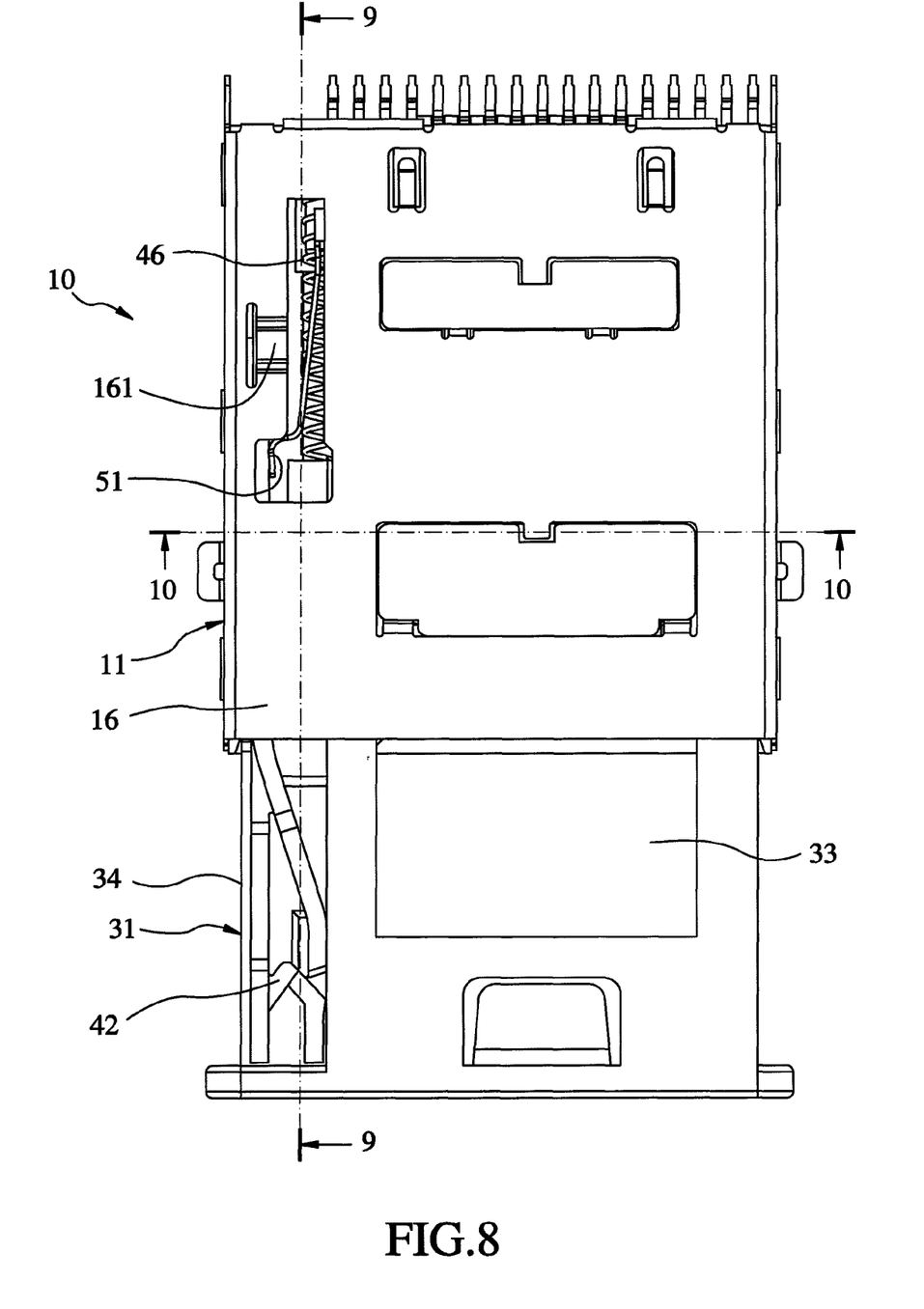
FIG. 8 is similar to FIG. 7, illustrating that the card tray is moved backward for some distance.
Figure 9:
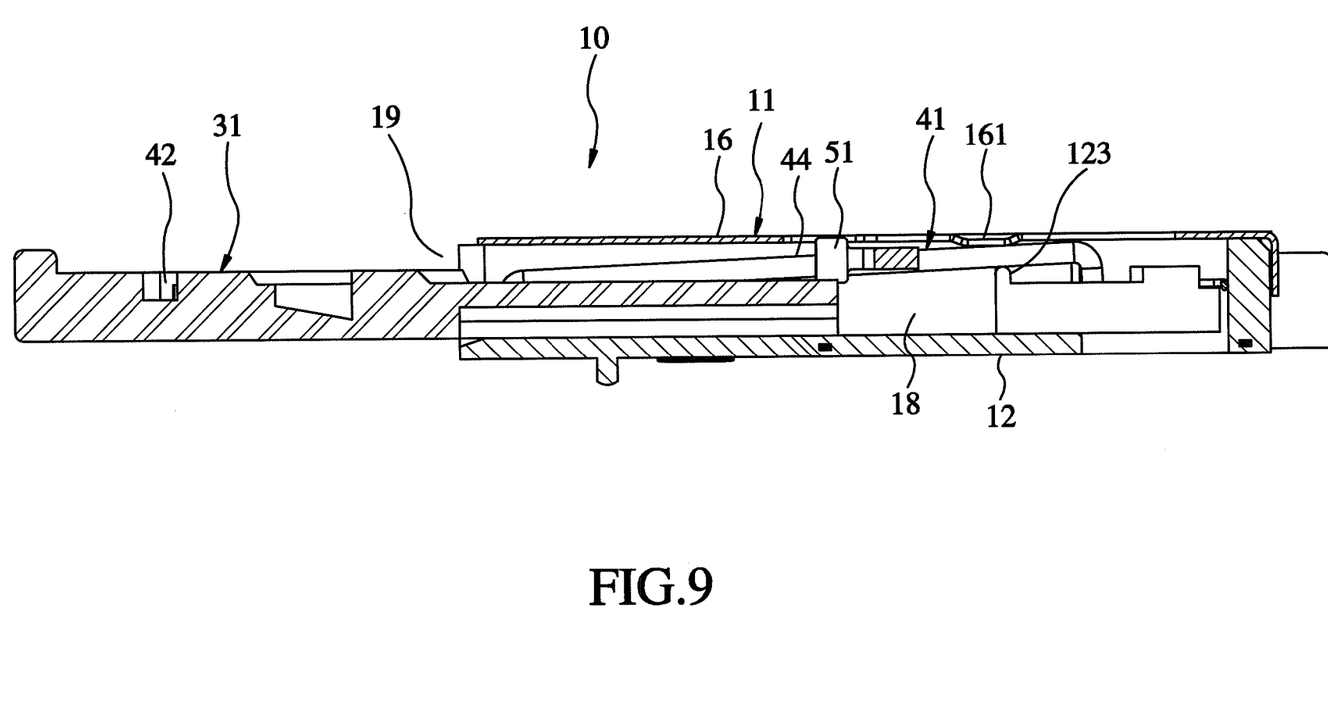
FIG. 9 is a sectional view taken along a line 9-9 indicated in FIG. 8.
Figure 10:
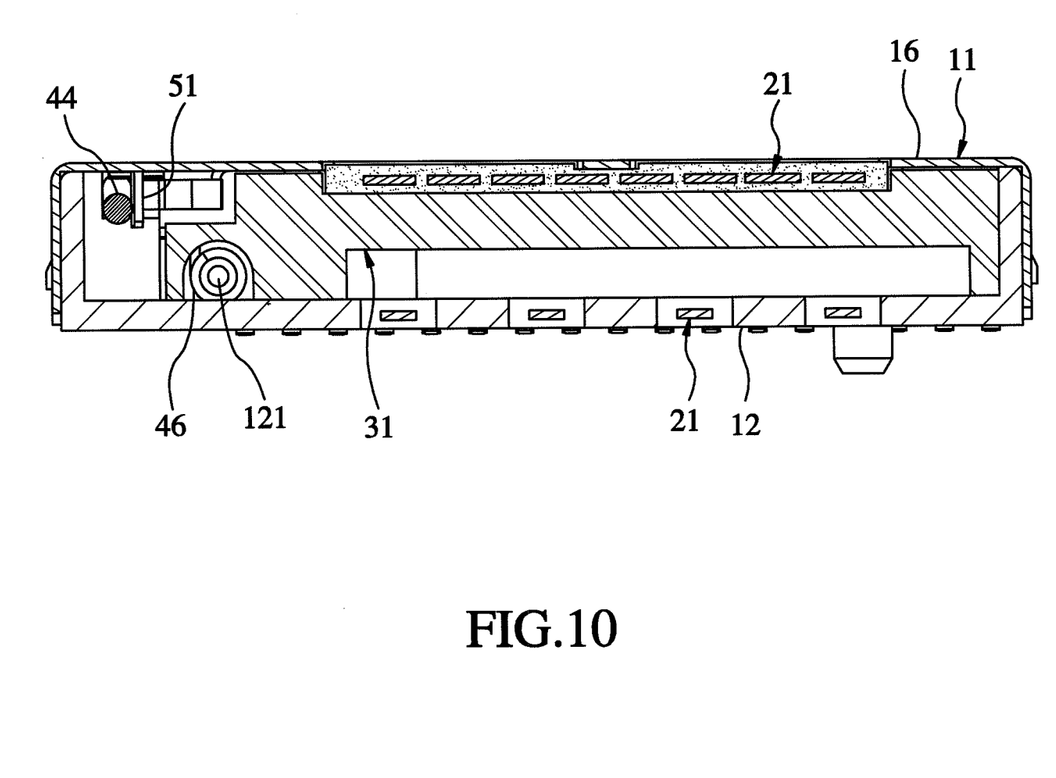
FIG. 10 is a sectional view taken along a line 10-10 indicated in FIG. 8.

FIG. 4 illustrates that the card tray 31 is locked by the guide member 44, after it is pushed inward, to be located at an entry position. FIG. 5 illustrates that the guide member 44 pushes the card tray 31 to an exit position after the card tray 31 is pushed again. Because how the ejecting assembly 41 functions belongs to the prior art, more detailed recitation is skipped.

It is to be noted that the key point of the present invention focuses on the relationship between the card tray 31 and the ejecting assembly 41 rather than what is between the card tray 31 and the memory card, the card supporting portions 32 and 33 of the card tray 31 other than the memory card are shown in the drawings.

Figure 11:
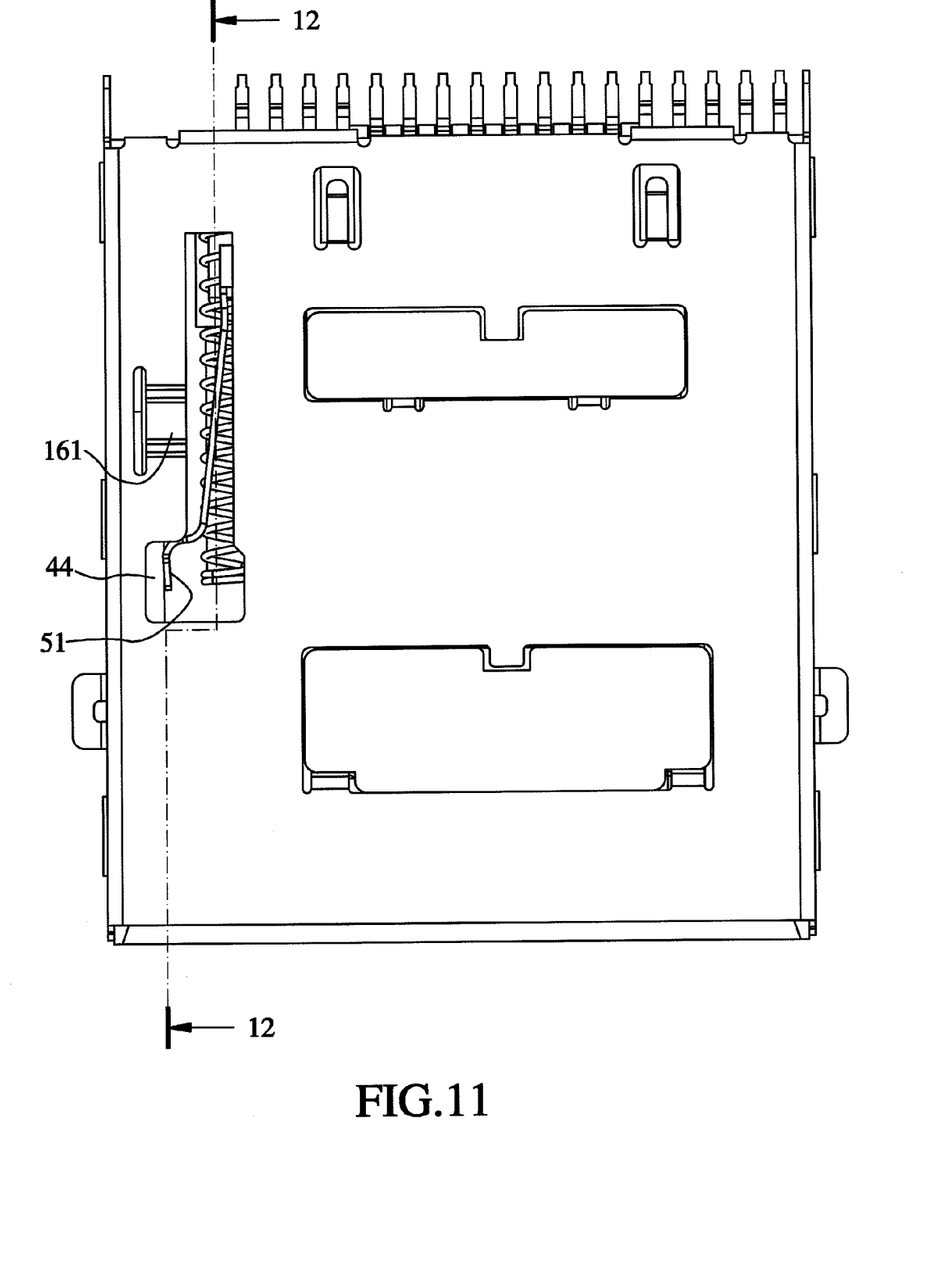
FIG. 11 is a top view of the preferred embodiment of the present invention, illustrating that the card tray is not inserted into the card connector.
Figure 12:
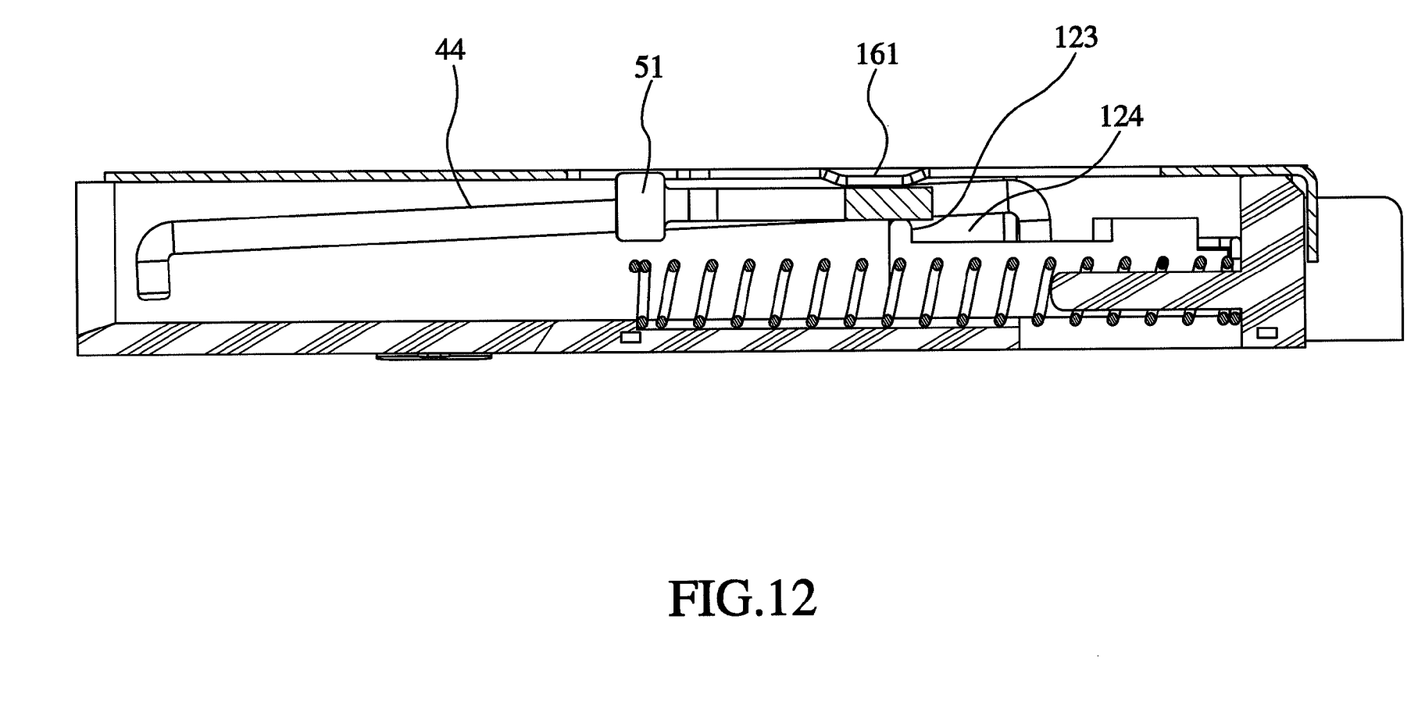
FIG. 12 is a sectional view taken along a line 12-12 indicated in FIG. 11.

Referring to FIGS. 11-12, before the card tray 31 is inserted into the card connector 10, the guide member 44 is pushed sideward by the springy biasing member 51 to contact against the locating wall 124 and meanwhile the guide member 44 is held in position by the support piece 123 and the suppressing portion 161, such that the guide member 44 is fixed to the aforesaid predetermined position.

Figure 13:
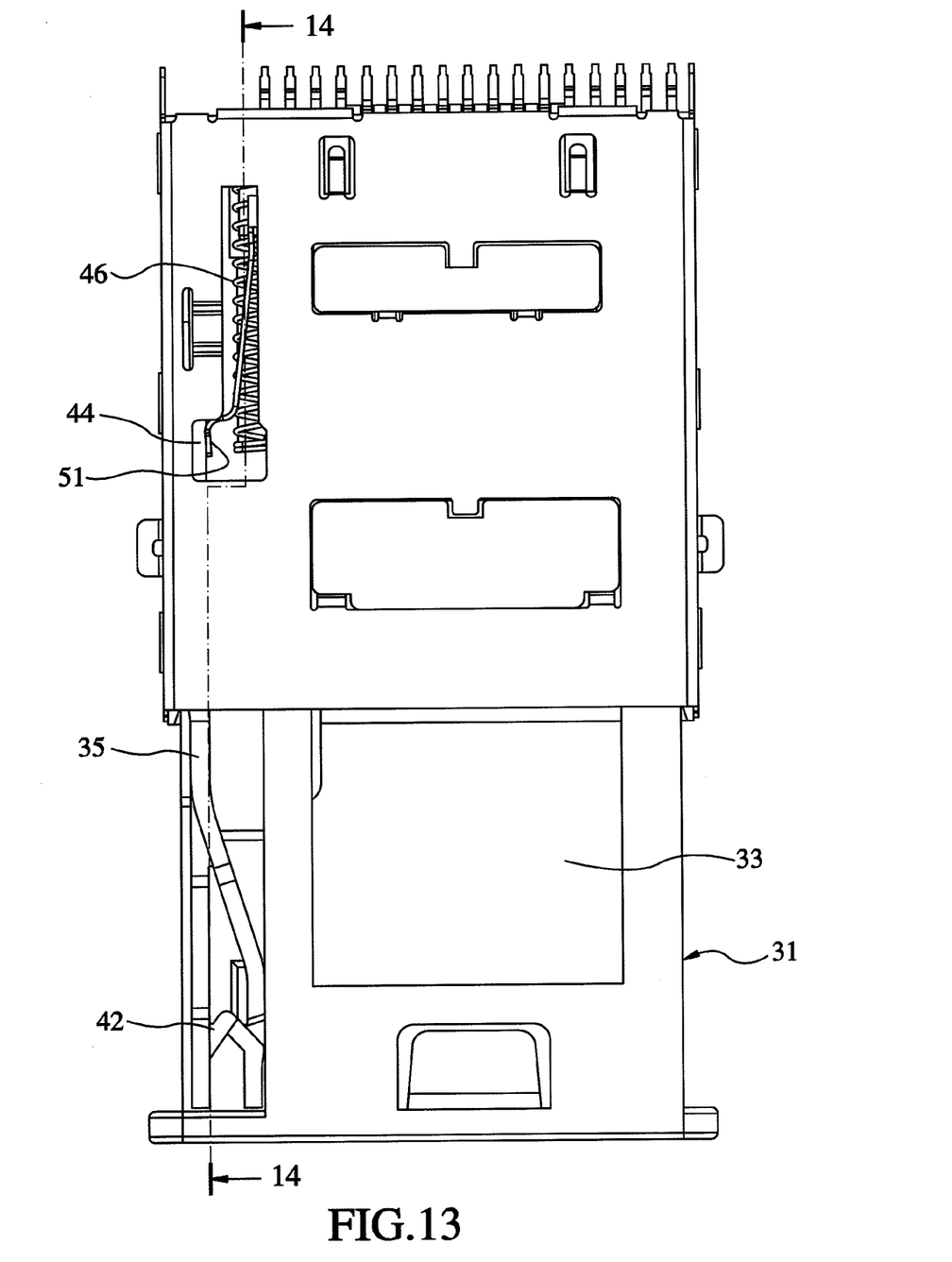
FIG. 13 is a top view of the preferred embodiment of the present invention, illustrating that the card tray is just inserted into the card tray and does not contact the interference portion of the guide member.
Figure 14:
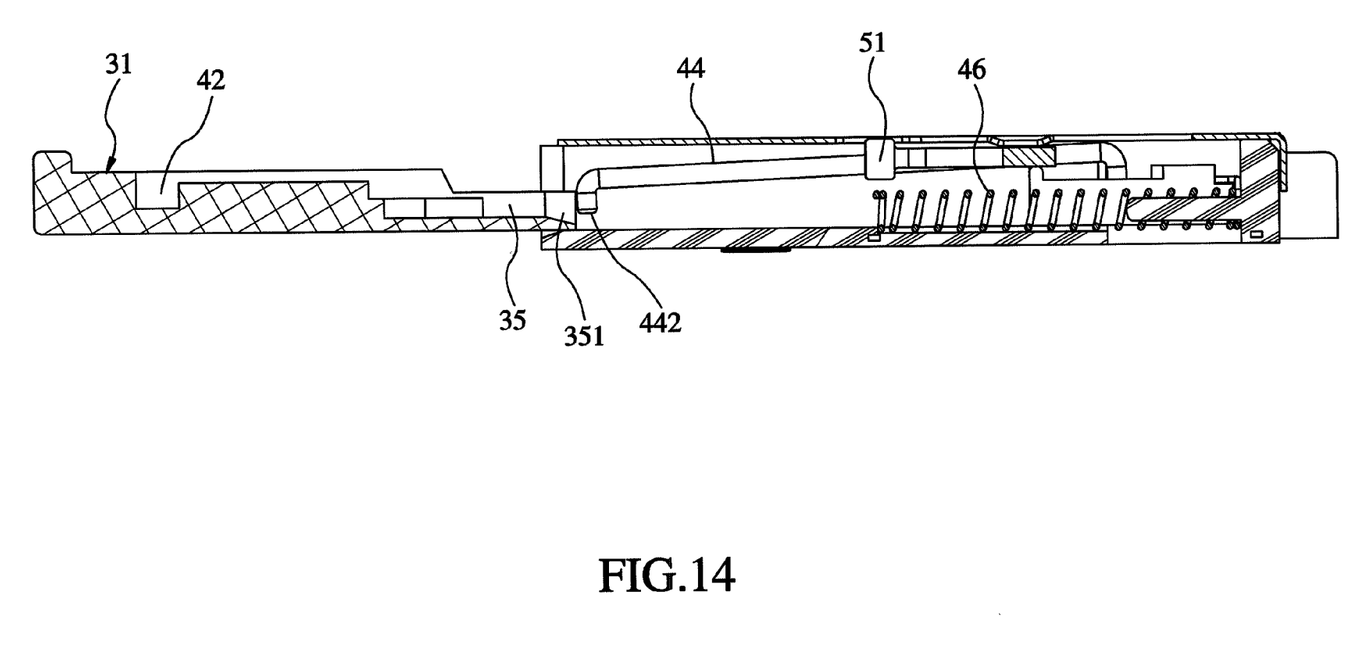
FIG. 14 is a sectional view taken along a line 14-14 indicated in FIG. 13.

Referring to FIGS. 13-14, when the card tray 31 is inserted into the card connector 10, the open end 351 corresponds to the predetermined position to allow entry of the interference portion 442 and meanwhile, the extension groove 35 is getting lower from front to back and its lowest position is lower than the interference portion 442, such that the interference portion 442 can enter the extension groove 35 successfully without any hindrance. When the card tray 35 continues to enter and move toward the innermost position of the insertion chamber 18, the interference portion 442 reaches and works on the heart-shaped guide groove 42. After an external force (e.g. the pushing force of the user's finger) is released, the card tray 31 is forced by the spring 46 to move outward and then the guide member 44 works on the heart-shaped guide member 42 to lock the card tray 31 to the entry position, as shown in FIG. 4; meanwhile, the hear-shaped guide groove 42, the guide member 44, and the springy member 46 can work on the card tray 31 to allow the user to push the card tray 31 for the insertion and ejection of the memory card. During the insertion and ejection of the memory card, the guide member 44 is resiliently forced by the springy biasing member 51 to be not fixedly suppressed, so the guide member 44 can still overcome the resilience of the springy biasing member 51 to normally pivot. Besides, when the card tray 31 is inserted into the innermost position of the insertion chamber 18, if the card supporting portions 32 and 33 carry two memory cards, the two memory cards can electrically contact the two terminal sets 21 for access to the memory cards.

When it is intended to eject the memory card, as shown in FIG. 5, the user can push the card tray 31 to enable the ejecting assembly 41 to drive the card tray 31 to move outward for some distance, which is the distance between the interference portion 442 and two stop points of the heart-shaped guide groove 42; the two stop points of the heart-shaped guide groove 42 belong to the prior art, so no more recitation is necessary. In the meantime, the user can separate the card tray 31 from the shell 11. During the separation, the interference portion 442 disengages through the extension groove 35 and no longer contacts the card tray 31, so the card tray 31 can be separated from the shell 11 without any interference, and the interference portion 442 is forced by the springy biasing member 51 to come back to the aforesaid predetermined position; meanwhile, the card connector 10 restores the status that the memory card is not inserted, as shown in FIGS. 11-12. Besides, the fastening portion 461 is fixed to the corresponding portion 122, so the springy member 46 does not fall off the shell 11 while the card tray 31 is separated from the shell 11.

In light of the above, the present invention can allow separation of the card tray 31 therefrom in addition to the insertion and ejection of the memory card and the card tray 31 can still function normally while put back into the card connector.

In this embodiment, the fastening portion 461 of the springy member 46 is not one of the essential elements because the spring member 46 without the fastening portion 461 can be prevented from falling off the shell 11 by means of the limitation of the space in the shell 11 or by interference fit to the locating pin 121. Besides, the locating pin 121 is not one of the essential elements either because the springy member 46 can be prevented from movement by the limitation of the insertion chamber 18 of the shell 11.

Furthermore, the location of the heart-shaped guide groove 42 and the extension groove 35 is not limited to the top side of the lateral portion 34. As disclosed in the aforesaid prior art, the heart-shaped groove is mounted to one side of the sliding box. Thus, wherever the heart-shaped guide groove 42 and the extension groove 35 are located at either side of the card tray 31, it is not limited as long as the memory card can be normally inserted into or ejected from the card connector.

Moreover, the support piece 123 is not one of the essential elements either. Without the support piece 123, the guide member 44 can still be pushed by the springy biasing member 51 and interfered by the heart-shaped guide groove 42 for normal pivoting movement.

In addition, each of the numbers of the terminal set 21 and the card supporting portion 32 (33) being two are for example only. Only one terminal set 21 and one card supporting portion 32 or 33 can be applied to the present invention; meanwhile, the card tray 31 can receive only one memory card; the terminal set 21 is selectively mounted to the base frame 12 or the cover 16 subject to the spirit of the present invention, so the drawing showing that one terminal 21 works with one of the card supporting portions 32 and 33 is omitted. In a word, each of the numbers of the terminal set 21 and the card supporting portion 32 (33) is not limited.

Although the present invention has been described with respect to a specific preferred embodiment thereof, it is in no way limited to the specifics of the illustrated structures but changes and modifications may be made within the scope of the appended claims.

What is claimed is:

1. A card connector comprising:
    a shell having an insertion chamber formed therein, the shell having an entrance formed at a front side thereof and communicating with the insertion chamber;
    at least one terminal set having a plurality of terminals and mounted to the shell and extending into the insertion chamber;
    a card tray inserted through the entrance and having at least one card supporting portion and a lateral portion, the least one card supporting portion being adapted for receiving at least one memory card; while the card tray is inserted into the shell, the at least one card supporting portion is located at the insertion chamber to allow the least one memory card to electrically contact the at least one terminal set;
    an ejecting assembly having a heart-shaped guide groove, a guide member, and a springy member, the heart-shaped guide groove being formed at the shell, the guide member having two ends, one of which is provided with a pivot portion mounted to the lateral portion of the card tray and the other is provided with an interference portion for interference with the heart-shaped guide groove, the guide member being suppressed by the shell to be limited to a predetermined height, the springy member being mounted inside the shell and working on the card tray for resiliently pushing the card tray outward; and
    a springy biasing member mounted to the shell and resiliently working on the guide member for forcing the interference portion of the guide member to a predetermined position;
    wherein the lateral portion of the card tray further comprises an extension groove having two ends, one of which communicates with the heart-shaped guide groove and the other extend rearward to a distal end of the lateral portion to be an open end; when the card tray is inserted into the shell, the open end of the extension groove corresponds to the predetermined position to allow entry of the interference portion.

2. The card connector as defined in claim 1, wherein the springy member is a compression spring having a fastening portion formed at an end thereof and fixed to the shell.

3. The card connector as defined in claim 2, wherein the shell comprises a locating pin; the end of the springy member where the fastening portion is provided is sleeved onto the locating pin to be stopped against the shell, the shell having a corresponding portion for fastening the fastening portion.

4. The card connector as defined in claim 1, wherein the interference portion is located in front of the pivot portion.

5. The card connector as defined in claim 1, wherein the heart-shaped guide groove and the extension groove are mounted to a top side of the lateral portion, the extension groove being getting lower from front to back, the lowest position of the extension groove being lower than a bottom end of the interference portion.

6. The card connector as defined in claim 5, wherein the shell comprises a support piece located between the interference portion and the pivot portion for supporting the guide member up to a predetermined height.

7. The card connector as defined in claim 1, wherein the shell comprises a suppressing portion located above the guide member for suppressing and confining the guide member to a predetermined height.

8. The card connector as defined in claim 1, wherein the shell is formed of a base frame and a cover; the at least one terminal set is mounted to one of the base frame and the cover.

9. The card connector as defined in claim 8, wherein the at least one terminal set is two in number, one of the terminal sets being mounted to the base frame and the other being mounted to the cover; the at least one card supporting portion is two in number, the two card supporting portions being superimposed on each other for carrying a memory card each; when the card tray is inserted into the shell, the two card supporting portions are located at the insertion chamber to allow the two memory cards to electrically contact the terminal sets respectively.

10. The card connector as defined in claim 1, wherein the shell comprises a locating wall formed at a side of the insertion chamber and close to the pivot portion and located at a front side of the pivot portion; the springy biasing member is a tongue having two ends, one of which is mounted to the shell and the other is resiliently stopped against the guide member for resiliently forcing the guide member to the locating wall in such a way that the pivot portion is fixed to the predetermined position.

* * * * *